US006975352B2

(12) United States Patent
Seeger et al.

(10) Patent No.: US 6,975,352 B2
(45) Date of Patent: Dec. 13, 2005

(54) APPARATUS AND METHOD FOR CAPTURING A COMPOSITE DIGITAL IMAGE WITH REGIONS OF VARIED FOCUS AND MAGNIFICATION

(75) Inventors: Mauritius Seeger, Royston (GB); Stuart A. Taylor, Cambridge (GB)

(73) Assignee: Xerox Corporation, Stamford, CT (US)

( * ) Notice: Subject to any disclaimer, the term of this patent is extended or adjusted under 35 U.S.C. 154(b) by 897 days.

(21) Appl. No.: 09/737,965

(22) Filed: Dec. 18, 2000

(65) Prior Publication Data

US 2002/0075389 A1    Jun. 20, 2002

(51) Int. Cl.[7] .......................... H04N 7/00; H04N 5/225; G06K 9/36
(52) U.S. Cl. ...................... 348/218.1; 348/36; 382/284
(58) Field of Search .......................... 348/222.1, 218.1, 348/36–39, 96; 382/293–294, 284, 435; 235/462.01, 235/462.05; 358/473, 474, 488; 250/334

(56) References Cited

U.S. PATENT DOCUMENTS

| 5,386,107 A | | 1/1995 | Dvorkis et al. ............. 235/472 |
| 5,557,366 A | * | 9/1996 | Hirai et al. .................. 396/159 |
| 5,686,960 A | * | 11/1997 | Sussman et al. .......... 348/218.1 |
| 5,798,516 A | | 8/1998 | Shreesha ..................... 235/472 |
| 5,834,762 A | * | 11/1998 | Matsuda et al. .......... 250/208.1 |
| 5,835,241 A | | 11/1998 | Saund ......................... 358/488 |
| 5,920,657 A | * | 7/1999 | Bender et al. ............... 382/284 |
| 6,075,905 A | * | 6/2000 | Herman et al. ............. 382/284 |
| 6,118,484 A | * | 9/2000 | Yokota et al. .............. 348/350 |
| 6,181,379 B1 | * | 1/2001 | Kingetsu et al. ............ 348/364 |
| 6,463,220 B1 | * | 10/2002 | Dance et al. ................ 396/431 |
| 6,466,262 B1 | * | 10/2002 | Miyatake et al. ........... 382/284 |
| 6,535,250 B1 | * | 3/2003 | Okisu et al. ................ 348/345 |
| 6,618,511 B1 | * | 9/2003 | Mancuso et al. ........... 382/293 |
| 2001/0010546 A1 | * | 8/2001 | Chen .......................... 348/218 |

OTHER PUBLICATIONS

U.S. Appl. No. 09/408,873, entitled: "Mosaicing Images With An Offset Lens", filed Sep. 29, 1999.
A. Doncescu, A. Bouju, V. Quillet, "Former Books Digital Processing: Image Warping", IEEE Workshop on Document Image Analysis, Jun. 16-20, 1997.
Benny Rousso, Shmuel Peleg, Ilan Finci, "Video Mosaicing using Manifold Projection", British Machine Vision Conference (BMVC), vol. 1, pp. 1-10, 1997.

* cited by examiner

*Primary Examiner*—Thai Tran
*Assistant Examiner*—Kelly Jerabek

(57) ABSTRACT

A camera apparatus obtains a sharp, high-resolution image of an object which is difficult to focus in a single image at a fixed focus, such as the imaging of a document using a document camera held at an oblique angle to the document. The apparatus composites an image of an object from plural image segments of the object acquired at different focusing distances. High quality regions (i.e. sharply focused and/or high resolution) are extracted from each image to form the segments for compositing.

20 Claims, 5 Drawing Sheets

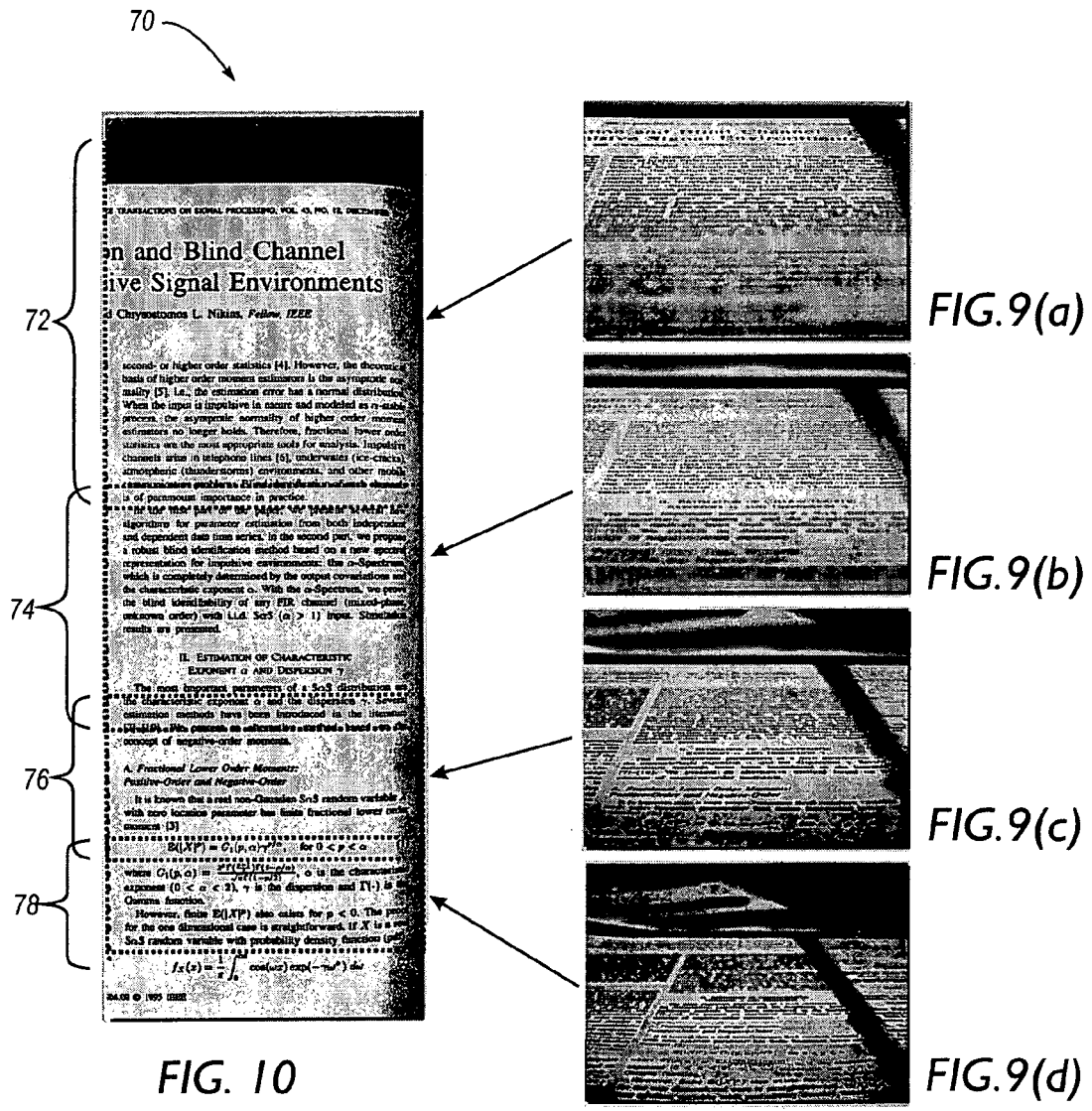

APPARATUS AND METHOD FOR CAPTURING A COMPOSITE DIGITAL IMAGE WITH REGIONS OF VARIED FOCUS AND MAGNIFICATION

BACKGROUND OF THE INVENTION

1. Field of the Invention

This invention relates to capturing a digital image. In a preferred form, the invention relates to a digital camera and to a method of operation.

The invention is especially suitable for use with, or for inclusion in, so-called document cameras for capturing digital images of documents, for example, for storage, or for processing by optical character recognition (OCR). However, the invention is not limited only to such a field, and may find application for use with, or for inclusion in, general digital-photography cameras.

The invention is also especially suitable for use with, or for inclusion in, handheld cameras, but it is not limited exclusively to such cameras.

2. Description of Related Art

Many designs of camera for capturing a digital image of a document are known, including hand-held cameras.

However, when using a hand-held document camera, the camera will often be held at an oblique angle relative to the document (in other words, it is often impractical to hold the document camera in a plane parallel to the plane of the document). In such a case, the captured document image can suffer from distortion including perspective distortion, and from out of focus blur. Although perspective distortion may be corrected by dewarping techniques, this can lead to low-resolution and poor image quality. In addition, out-of-focus blur may be present in parts of the image due to the oblique angle.

An example of such problems in a captured image is illustrated in FIGS. 1, 2 and 3. FIG. 1 depicts a camera operator 10 holding a camera 12 at an oblique angle to capture an image of a document 14.

FIG. 2 shows a typical captured document image 16 in such a case. It is immediately evident that the captured image suffers from perspective distortion. The edges of the text columns are not "vertical" (i.e. perpendicular to the text lines); the text appears compressed in a horizontal direction and the text varies in size from top to bottom of the image; and individual letters incline towards the edges of the image.

Dewarping techniques are known for geometrically transforming an image to correct the perspective distortion. For example, the image may be dewarped by expanding the horizontal image width progressively from bottom to top, and also by expanding the image vertically to correct the horizontal compression.

FIG. 3 shows the result of such a dewarping technique applied to the image of FIG. 2. Although the perspective is restored, the image contains poor quality regions 18 and 20 which suffer from out-of-focus blur. The upper region 18 of the document is too distant from the camera to be focused correctly, and the lower region 20 of the document is too close to the camera to be focused correctly. Only the central region 22 of the image is of clear quality. Additionally, the resolution of the upper (distant) portion 18 is very low as a result of the perspective distortion (which causes distant portions to appear smaller, and hence have a reduced resolution).

The above problem is not limited to document cameras. There are many situations in which it is impossible to capture an image in which an object is in focus throughout the image. For example, the object may be too large to be focused correctly. Additionally, it is often impossible to capture both a foreground and background together in focus.

Although not relevant to the present field, reference may be made to the bar-code readers described in U.S. Pat. Nos. 5,798,516 and 5,386,107. These documents describe arrangements for reading barcodes at unknown distance ranges. However, these documents do not address the problem of achieving a completely blur free image of an object at an oblique angle which may never be in perfect focus.

SUMMARY OF THE INVENTION

It would be advantageous to overcome or reduce the above problems.

A first aspect of the invention addresses the problem of out-of-focus blur in images. Broadly speaking, in contrast to the prior art technique of capturing an image at a fixed focus, one aspect of the present invention is to composite an image of an object from plural image segments of the object acquired at different focusing distances.

Such a technique can avoid the problems associated with out-of-focus blur occurring in images which are difficult to capture at a fixed focus.

In one form, the invention provides a technique in which plural images of an object are acquired at different focus distances, and the composited image is composited from plural segments derived from the plural captured images.

By acquiring plural images at different focus distances, there is a much higher probability that a region of one image which suffers from out-of-focus blur will be sharply focused in another captured image. Also, by compositing the optimum quality segments from the different captured images, a final image can be produced which would be impossible to capture in a single image with a fixed focus.

Preferably, the apparatus includes a processor for determining a geometric transform to apply to a captured image (or to a region thereof) to correct for image distortion (e.g., perspective distortion). Such a correction transform is also referred to herein as dewarping. The composited image is thus composited from perspective corrected segments, to produce a perspective corrected image.

Preferably, the apparatus comprises an image analyzer for analyzing the captured images for selection of a segment therefrom to use in the composited image. Preferably, the image analyzer analyses the quality of one or more regions of each captured image; indicative of the quality may be the sharpness of the image region.

Preferably, the apparatus comprises a variable focus mechanism which is controlled to vary the focus distance as the plural images are acquired.

In a particularly preferred form, the invention also addresses the problem of reduced resolution resulting from perspective distortion of relatively distant portions of an object. To address this, the apparatus preferably comprises a zoom mechanism for varying the magnification at which the image is captured, and means for controlling the zoom mechanism.

In one form, the zoom mechanism may be controlled in accordance with the focusing distance.

This can enable more distantly focused portions of an object to be acquired at a magnified resolution, to compensate at least to some degree for loss of resolution caused by perspective distortion of the distant portion.

A highly preferred feature of the invention, in whichever form it is used, is that the apparatus comprises a device for determining the registration of one captured image (or image segment) with another. In other words, the device identifies one or more points of registration between the images, so that the relative alignment and positions of the captured images is known. This is advantageous to enable the quality of image regions to be compared accurately in the different captured images, and to enable image segments to be selected and composited together to form a seamless composited image.

In a preferred form, the invention is implemented in a digital camera. However, in an alternative form, at least a portion of the image processing (e.g. dewarping, registration, quality analysis and compositing) may be performed using a separate image processor external to the camera.

BRIEF DESCRIPTION OF THE DRAWINGS

Two non-limiting embodiments of the invention are now described, by way of example only, with reference to the accompanying drawings, in which:

FIGS. 9(a)–9(d) are schematic diagrams of images captured by a camera; and

FIG. 10 is schematic representation of the final image composited from the images of FIGS. 9(a)–9(d).

DETAILED DESCRIPTION

Figure 1:
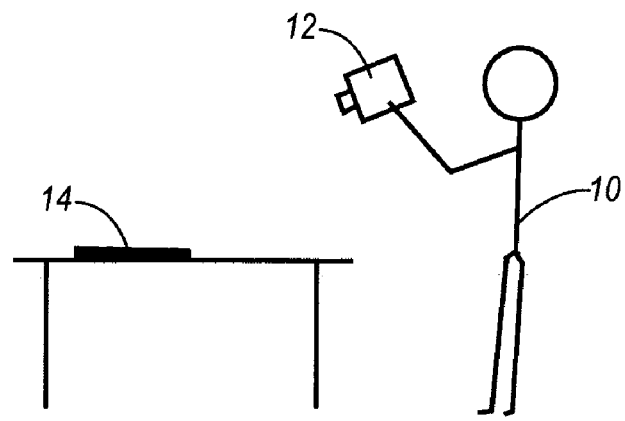
FIG. 1 is a schematic view of a user capturing an image of a document.
Figure 4:
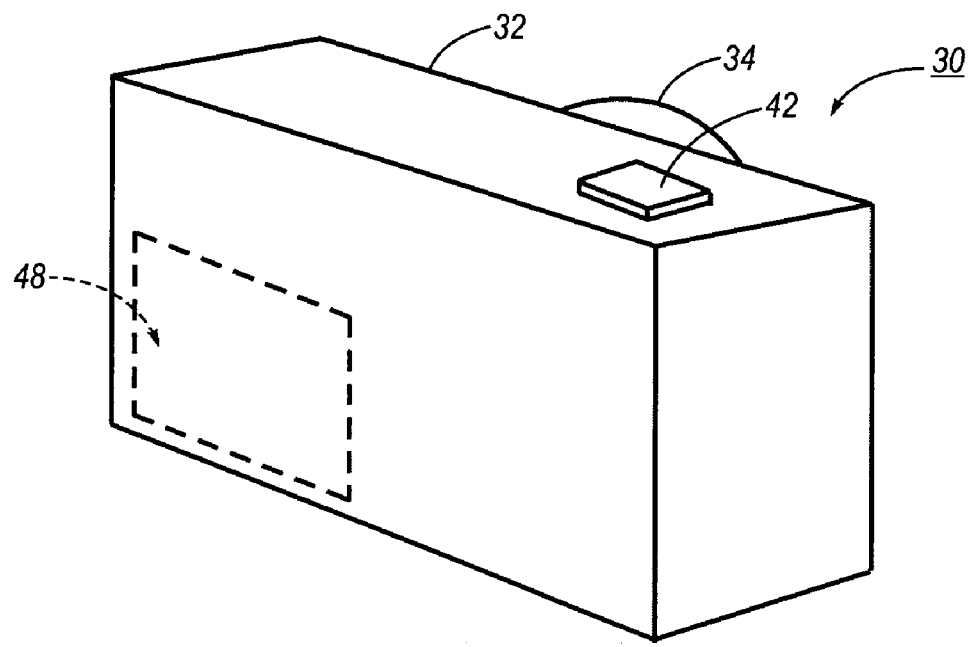
FIG. 4 is a schematic perspective view of a document camera.
Figure 5:
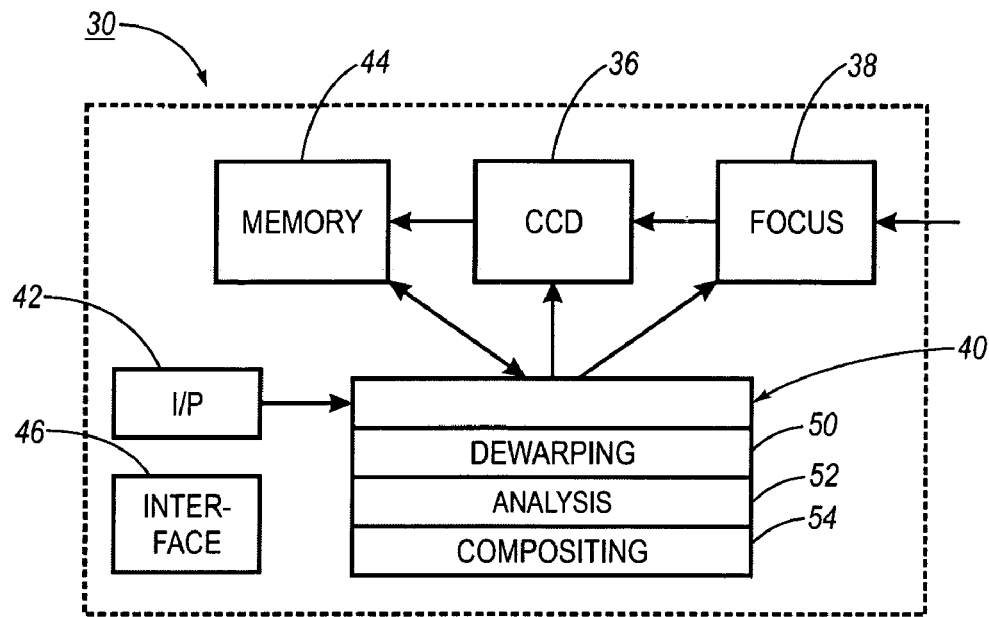
FIG. 5 is a block diagram showing some of the functional elements of the camera of FIG. 4 including a variable focus mechanism.

Referring to FIGS. 4 and 5, a first embodiment of a document camera 30 comprises a case 32 carrying an objective lens 34, and housing a photoelectric detector 36 (typically a charge coupled device (CCD)), a focus mechanism 38 for controllably varying the focusing distance of the lens 34, a control and processing circuit 40, one or more user inputs 42 including a "capture" button, and a storage device 44 for storing captured images. The storage device may consist of any suitable storage medium, for example, a semiconductor memory, or an optical medium, or a magnetic medium.

The camera additionally comprises an interface 46 (e.g. a connection port or a wireless interface) for uploading images from the camera and/or for downloading information or images into the camera. Additionally, the camera 30 may comprise a display 48 for displaying images.

One of the operating principles of this embodiment (described in more detail below) is to capture plural images of an object taken at different focus settings. Each image can be processed to determine a geometrical transformation to correct for image distortion. The images are analyzed to identify or quantify the quality of one or more regions of the image. Dewarped segments from the plural images are then composited, according to the quality of the segments, to form a final composited image.

By capturing plural images at different focus settings, many of the prior art problems of a single image at a single focus setting can be avoided. The final image is generated by compositing together optimum quality segments from the different captured images.

In this embodiment, the control and processing circuit 40 comprises a dewarping processor 50 for determining a geometric transform for correcting or dewarping an image, an image analyzer 52 for performing image registration and quality analysis, and an image compositor 54 for compositing the final image. Although the elements of the circuit 40 are shown as separate functional parts, it will be appreciated that the control circuit may comprise a processor and executable code for performing one or more of these functions.

The above image capture/dewarping/analysis/composition process is described in more detail with reference to FIG. 6. The process starts at step 60 when the camera operator presses the "capture" or "shutter release" button of the camera. At step 60, the control circuit 40 controls the camera to capture plural images of the object taken at different focus settings. In this preferred embodiment, the focus settings are swept over the focusing range of the camera. Typically, the number of images captured would be about 3, 4 or 5. However, this range is merely an example; the number may be smaller or greater, and may depend for example, on the range of possible focus settings, or on a user settable parameter, or on the quality results of previous images.

The plural images are preferably acquired sufficiently quickly to avoid large motions of the hand-held camera. However, some camera motion may still occur.

At step 62, each captured image is processed by the dewarping processor 50, to determine a geometric transform to correct the image for one or more of perspective distortion, scaling, rotation, barrel distortion, and page warp. The dewarping transform may be derived only on the basis of the image itself (e.g. based on identifying straight columns and lines of text, or based on the size ratio of letters). Alternatively, it may be faster and more reliable to use additional information regarding the object and the relative position and/or orientation of the camera. Although not shown explicitly in FIG. 5, one or more of the normal camera sensors may be used, for example, accelerometers, range sensors, focus, motion detection, etc. For example, the amount of perspective could be inferred from the detected orientation of the camera, it being assumed that the document is lying horizontal. Alternatively, the camera could be orientated initially to be "parallel" to the plane of the document, and then moved to the desired more comfortable orientation of use at which the images are to be captured. By detecting the initial orientation and the orientation of use, the degree of perspective can be inferred.

Alternative techniques are also known based on the projection of a known image shape on to the document, from a position offset from the optical axis. The parallax between the projection position and the optical axis of the camera causes the image to have a different shape when viewed along the optical axis of the camera. The difference between the viewed shape and the known projected shape provides a direct indication of the perspective distortion, and also other distortions such as page curvature. Generally such a technique is performed by capturing one or more images prior to the main image captures, and the projected image is turned off during the main image captures so as not to interfere with the object. More information about this type of technique can be found in U.S. Pat. No. 5,835,241, and also in Doncescu A. et al, "Former Books Digital Processing: Image Warping", Proc. Workshop on Document Image Analysis, San Juan, Puerto Rico, Jun. 20, 1997, Eds. L. Vincent & G. E. Kopec. The teachings of these documents are incorporated herein by reference.

Many alternative algorithms for dewarping images to correct geometrically for perspective distortion, scaling, rotation, barrel distortion and page warp, are well known to one skilled in the art, and need not be described in detail herein.

The output from the dewarping processor 50 may either be a geometric transform (to be applied later), or it may be in the form of a dewarped image to which the transform has already been applied.

At step 63, the images (whether or not dewarped) are processed by the image analyzer to identify the registration or correspondence of one image with respect to another. In the present embodiment, the camera's field of view does not change between image captures, and so any difference between image correspondence from one image to the next is a direct result of camera movement (normally accidental, but not necessarily).

A suitable registration algorithm is described, for example, in "An interactive image registration technique with an application to stereo vision " by B. D. Lucas and T. Kanade, Proc. DARPA Image Understanding Workshop 1981, pages 121–130. Other suitable registration algorithms are known to one skilled in the art, and so need not be described here in detail.

Depending on the embodiment, the registration may be carried out either on the images without dewarping, or on dewarped images. If the perspective distortion is the same (or is assumed to be the same) in each captured image, then the registration can be carried out on the original images without dewarping. However, if all situations are to be fully accommodated, then the registration can be carried out on the dewarped images.

It will be appreciated that, if desired, movement of the camera may be detected, for example, by one or more camera accelerometers, and such movement could be provided as an input to aid registration.

At step 64, the images (whether or not dewarped) are processed by the image analyzer 52 to identify the quality of image regions for selection to be included in the final image. For example, image blur can be identified using a maximum variance test or an analysis of the frequency components in the image. Correctly focused areas have high frequency components and high variance.

The analysis step may, for example, grade a region of an image according to its quality, or it may simply identify one or more regions which are suitable for the final image. The analyzer can also determine the relative qualities of an image region in the different captured images, to determine which captured image will provide the highest quality segment for composition.

At step 66, the image compositor 54 composites segments selected from the captured images to form a final image. If the geometric transforms have not yet been applied, then these are applied to each segment during composition of the final image. The image compositor preferably selects regions of highest quality to form the segments of the image, to provide the best possible composited image from the available captured images.

Figure 7:
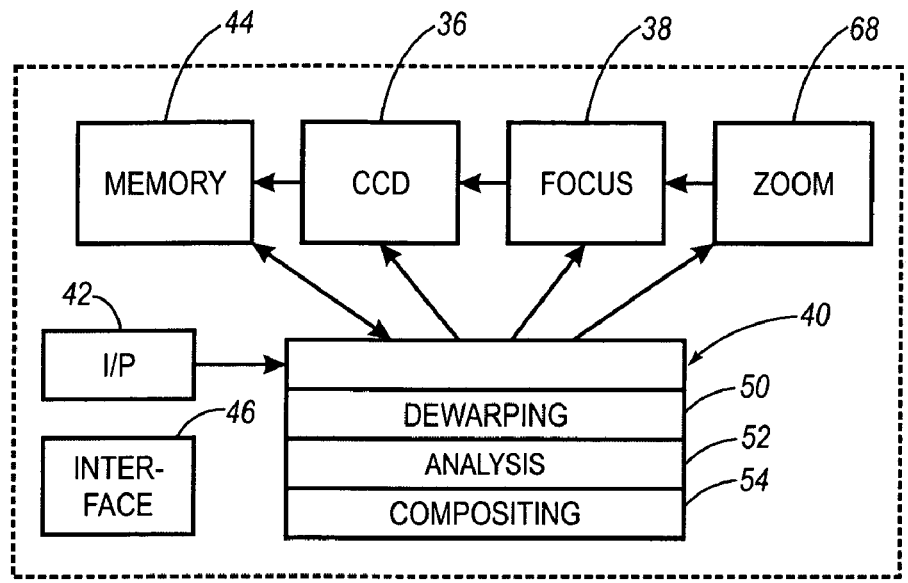
FIG. 7 is a block diagram showing some of the functional elements of a second embodiment of the camera.

A second embodiment of the invention is illustrated in FIG. 7. This is similar to the first embodiment described above, and like reference numerals are used where appropriate.

The second embodiment further improves on the first embodiment, by enabling the resolution of distant portions of an image to be increased. In the first embodiment, the resolution of an image is constant. This means that, as a result of perspective distortion at an oblique angle, distant portions of an object will appear smaller than, and hence will have a reduced resolution relative to, close portions. Even when a distant portion is correctly focused in the first embodiment, the resolution might in certain circumstances (particularly when the camera angle is very oblique) be insufficiently high to obtain a sharp image once the image is dewarped.

Referring to FIG. 7, in the second embodiment, the camera further comprises a zoom mechanism 68, for adjusting the focal length (and hence the magnification) of the lens assembly, under the control of the control circuit 40. By providing a zoom facility, it is possible to capture distant portions of an object at a higher resolution, in order to compensate for loss of resolution caused by perspective distortion.

Figure 6:
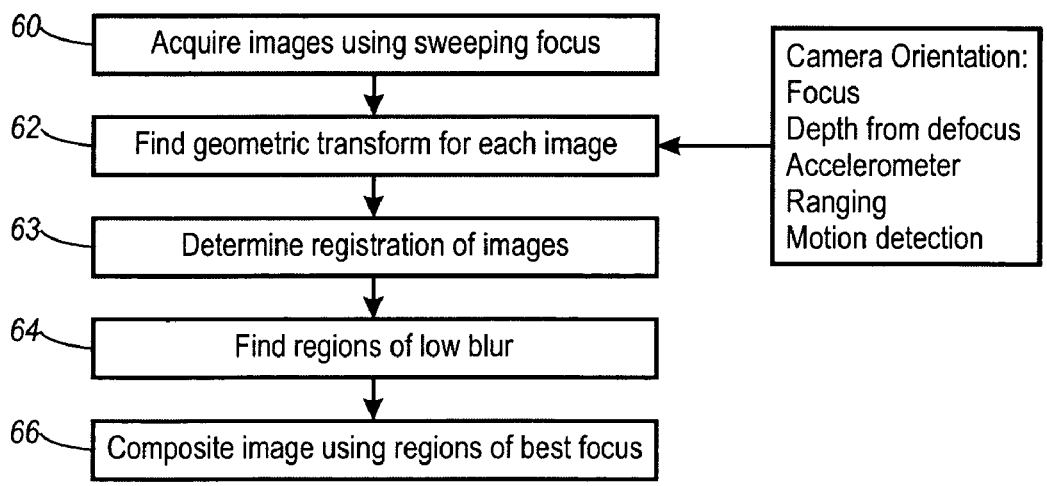
FIG. 6 is a flow diagram showing the principle of operation of the camera of FIG. 4.
Figure 8:
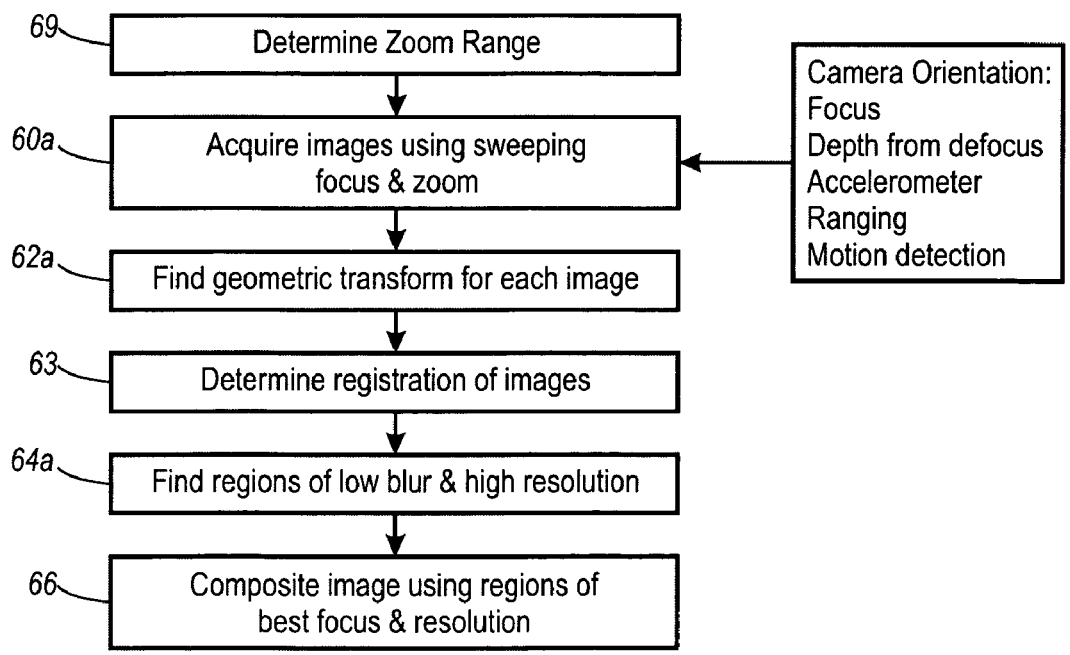
FIG. 8 is a flow diagram showing the principle of operation of the embodiment in FIG. 7.

Referring to FIG. 8, the image capture process is very similar to that of FIG. 6 except that, at step 60a, the control circuit 40 controls the zoom mechanism such that plural images are acquired at different zoom settings. Although it is possible to vary the focus and zoom settings independently, in this preferred embodiment the zoom level is controlled to increase as the focusing distance increases (or to decrease as the focusing distance decreases). Distant focused regions of the object are thus automatically captured at a higher resolution.

It will be appreciated that the amount of zoom required to compensate for the loss of resolution caused by perspective distortion, will depend on the amount of perspective distortion itself. In other words, the appropriate level of zoom will depend on the angle of the camera relative to the document. For example, camera is held at a very oblique angle relative to the document, the perspective distortion is severe; however, at a less oblique angle, the amount of perspective distortion (and the amount of zoom required to compensate for resolution) is reduced.

Figure 2:
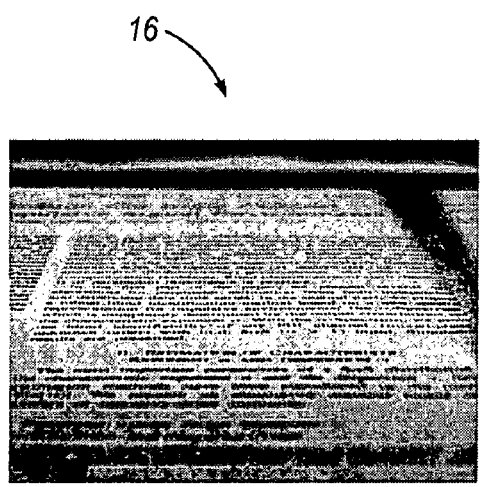
FIG. 2 is a schematic image of the document captured in FIG. 1.
Figure 3:
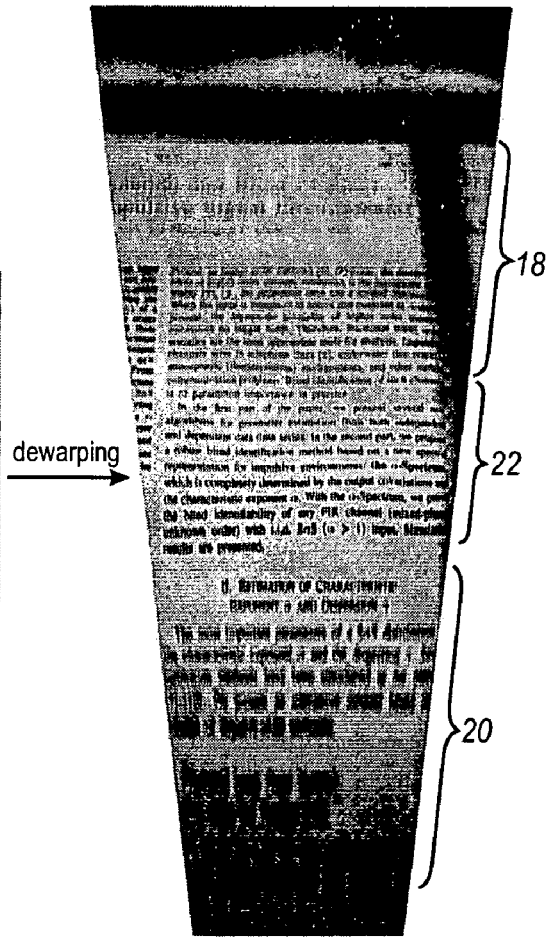
FIG. 3 shows the effect of dewarping the image of FIG. 2.

In the present embodiment, the amount of zoom is inferred at step 60a from camera sensors (e.g. accelerometers) which indicate the angle at which the camera is held (it being assumed that the document lies horizontally). Alternatively, an additional step 69 may be included prior to step 60a. At step 69, a low-resolution image of the object is acquired, and is processed to obtain optical information indicative of the amount of perspective distortion in the image. (For example, referring to FIG. 2, such optical information may be the inclination of edges of text or other object identifiable in the low-resolution image). However, it will be appreciated that such information could also be inputted to the camera manually by the camera user.

At step 62a, the zoom level is included as part of the determination of the geometric transform, in order for the correction to match the zoomed image.

At step 64a, the analysis also takes into account the resolution of image regions. The purpose of the analysis is to determine in-focus regions which also have high resolution, such that the image will still be sharp after dewarping.

An example of an image capture and processing using the second embodiment is shown in FIGS. 9 and 10. FIGS. 9a–9d depict a sequence of four images captured as the focus is varied from a distant setting (FIG. 9a) through progressively closer distances (FIGS. 9b and 9c) to a near setting (FIG. 9d). The zoom level is also controlled from a large zoom setting (FIG. 9a) at the largest focusing distance, through progressively less magnified settings (FIGS. 9b and 9c) to a least magnified setting (FIG. 9d) at the nearest focusing distance.

FIG. 10 shows the final image 70 produced by compositing together dewarped segments of the plural images of FIGS. 9a–9d. The image 70 is made up of a first segment 72 taken from the first image (FIG. 9a), a second segment 74 taken from the second image (FIG. 9b), a third segment 76 taken from the third image (FIG. 9c), and a fourth segment 78 taken from the fourth image (FIG. 9d). As can be seen in FIG. 10, there is some degree of possible overlap between the image segments which have acceptable quality (sharp focus and high resolution). This indicates that the number of plural images is adequate to provide a high quality image of the entire object, and that there are no quality "gaps" in the composited image.

The invention, particularly as described in the preferred embodiments, can enable sharp, high quality images to be acquired from documents even when the camera is held at an oblique angle. The invention can be used to correct for book curvature and the resulting out-of-focus and low-resolution areas resulting from a single image at a fixed focus. The invention can also be used to scan books from an oblique angle when the opening of the book is restricted, for example, for valuable or old books.

Although the invention is especially suitable for document capture, the invention may be used for any digital camera for imaging three-dimensional objects of all kinds which might be difficult to bring in to focus in a single image.

In the above embodiments, the camera comprises a variable focus mechanism 38 for varying the camera focusing distance under the control of the control circuit 40. In an alternative embodiment, the focus may be swept manually by physical camera movement.

The invention may also be used in combination with image mosaicing, so that larger areas may be imaged. In this way, images suffering from extreme distortion can be recovered with a sufficiently high resolution (without mosaicing, the maximum resolution is limited by the size of the document).

Such a combination would include motion of the camera as well as focus (and focal length) sweeping. A suitable mosaicing technique is described in U.S. patent application Ser. No. 09/408,873 entitled "Mosaicing images with an offset lens", the contents of which is incorporated herein by reference.

The focus and focal length sweeping may also be used in conjunction with a moving linear sensor (instead of a traditional area sensor). This allows an image to be acquired with variable resolution in one direction. The basis for such a technique is also described in the above-incorporated U.S. patent application Ser. No. 09/408,873.

The method of the present invention may be combined with a shift lens or any other image-shifting device so that the position of the image can be adjusted when the focal length is increased. Such a system is especially useful if unwanted motion is present, as in a portable camera, for example.

In the preferred embodiments, the invention is implemented within a camera unit. This can provide an extremely powerful camera technique. However, in other embodiments for less complicated or less expensive cameras, it is possible to perform at least some of the image processing (for example, dewarping, registration, quality analysis, and composition) using an external image processor (for example, offline processing). In such alternative embodiments, it is preferred that data representing physical characteristics of the camera (such as orientation, focus setting, zoom setting, etc.) be recorded with each image to assist in later processing of the images.

It will be appreciated that the foregoing description is merely illustrative of preferred embodiments of the invention, and that many modifications and equivalents will occur to one skilled in the art within the spirit and scope of the present invention.

What is claimed is:

1. An apparatus for capturing an image, comprising:
   an image capture device for capturing plural image segments of an object scene at different focus distances and zoom settings; the image capture device having: a variable focus mechanism for varying the focus distance for the image capture device, a variable zoom mechanism for varying the zoom setting for the image capture device, and a controller operative to control the variable focus mechanism and the variable zoom mechanism to vary the focus setting and the zoom setting in combination;
   a perspective correction device for determining at least one geometric transform to correct the plural image segments for perspective distortion; and
   an image compositor for compositing a perspective corrected image of said object scene from the plural image segments with varied focus and magnification to which said at least one geometric transform has been applied;
   wherein the image capture device is positioned at an oblique angle to the object scene when capturing the plural image segments; and
   wherein the image capture device compensates for the perspective distortion by increasing, at a level that varies depending on the oblique angle to the object scene, the zoom setting as the focus distance is increased.

2. An apparatus according to claim 1, wherein the apparatus is implemented in a camera.

3. An apparatus according to claim 1, further comprising an image analyzer for analyzing the captured images for selection of a segment of the captured image for the compositor.

4. An apparatus according to claim 3, wherein the image analyzer comprises a registration detector for identifying the registration of one image with respect to another.

5. An apparatus according to claim 3, wherein the image analyzer is operative to analyze the quality of at least a region of a captured image, for selection of a segment therefrom for the compositor according to the image quality of the segment.

6. An apparatus according to claim 5, wherein the quality is determined by the sharpness of the image.

7. An apparatus according to claim 5, wherein the quality is determined by the resolution of the image.

8. An apparatus according to claim 1, wherein the variable zoom mechanism further comprises a sensor for automatically inferring the zoom settings.

9. An apparatus according to claim 8, wherein the sensor is an accelerometer.

10. A method of generating a digital image of an object, the method comprising:

capturing plural image segments of an object scene at different focus distances and zoom settings while controlling in combination the focus distance and the zoom setting;

determining at least one geometric transform for correcting the plural image segments for perspective distortion; and compositing a perspective corrected image from the plural image segments with varied focus and magnification to which the at least one geometric transform has been applied;

wherein said capturing further comprises:

capturing the plural image segments of the object scene at an oblique angle to the object scene;

compensating for the perspective distortion by increasing, at a level that varies depending on the oblique angle to the object scene, the zoom setting as the focus distance is increased.

11. A method according to claim 10, further comprising analyzing at least one region of each captured image or image segment to identify the quality of said region in that captured image; and wherein the step of compositing comprises compositing the image of the object from image segments extracted from the plural captured images according to the result of the quality analysis.

12. A method according to claim 11, wherein the step of analyzing comprises determining the relative qualities of a region of an image in the plural captured images, and identifying which captured image provides said region with the best quality.

13. A method according to claim 11, wherein the quality analysis comprises analyzing at least one characteristic selected from the characteristics of: image sharpness; and image resolution.

14. A method according to claim 10, wherein the method is implemented in a camera.

15. A method according to claim 14, further comprising automatically inferring the zoom settings with a sensor of the camera.

16. A method according to claim 15, wherein said inferring infers the zoom settings with an accelerometer.

17. An apparatus for capturing a document image, comprising:

an image capture device for capturing plural image segments of a document scene at different focus distances and zoom settings; the image capture device having:

a relative angle with the document scene, a variable focus mechanism for varying the focus distance for the image capture device, a variable zoom mechanism for varying the zoom selling for the image capture device depending on the relative angle between the image capture device and the document scene, and a controller operative to control the variable focus mechanism and the variable zoom mechanism to vary the focus setting and the zoom setting in combination;

a perspective correction device for determining at least one geometric transform to correct the plural image segments of the document scene for perspective distortion; and an image compositor for compositing a perspective corrected image of the document scene from the plural image segments with varied focus and magnification to which said at least one geometric transform has been applied;

wherein the relative angle between the image capture device and the document scene is an oblique angle;

wherein the image capture device compensates for the perspective distortion by increasing, at a level that varies depending on the oblique angle to the document scene, the zoom setting as the focus distance is increased.

18. An apparatus according to claim 17, further comprising a sensor for inferring the relative angle between the image capture device and the document scene.

19. An apparatus according to claim 18, wherein the sensor is an accelerometer.

20. An apparatus according to claim 18, further comprising an image analyzer for analyzing the plural image segments for selection of a segment of the document scene for the compositor according to the image quality of the segment.

* * * * *